United States Patent [19]
Stewart

[11] Patent Number: 5,129,180
[45] Date of Patent: Jul. 14, 1992

[54] TEMPERATURE SENSITIVE SEED GERMINATION CONTROL

[75] Inventor: Ray F. Stewart, Redwood City, Calif.

[73] Assignee: Landec Labs, Inc., Menlo Park, Calif.

[21] Appl. No.: 624,891

[22] Filed: Dec. 7, 1990

[51] Int. Cl.$^5$ .................. A01C 1/06; A01C 21/00; A01G 5/06; A01N 1/00

[52] U.S. Cl. .................. 47/57.6; 47/DIG. 9; 71/3; 71/65; 71/77; 427/4

[58] Field of Search ............ 47/57.6, 74, DIG. 9; 71/3, 4, 65, 77, 79, DIG. 1, 64.13, 904; 427/4

[56] References Cited

U.S. PATENT DOCUMENTS

| | | | |
|---|---|---|---|
| 3,545,129 | 12/1970 | Schreiber et al. | 47/57.6 |
| 3,698,133 | 10/1972 | Schreiber | 47/57.6 |
| 3,808,740 | 5/1974 | Porter et al. | 47/57.6 |
| 3,920,436 | 11/1975 | Janssen | 47/DIG. 9 |
| 4,238,523 | 12/1980 | Porter et al. | 47/57.6 |
| 4,251,952 | 2/1981 | Porter et al. | 47/DIG. 9 |
| 4,344,979 | 8/1982 | Gago et al. | 47/57.6 |
| 4,735,017 | 4/1988 | Gago et al. | 47/57.6 |
| 4,769,945 | 9/1988 | Motoyama et al. | 47/57.6 |
| 4,777,762 | 10/1988 | Redenbaugh et al. | 47/DIG. 9 |
| 4,779,376 | 10/1988 | Redenbaugh | 47/57.6 |
| 4,780,987 | 11/1988 | Nelsen et al. | 47/57.6 |
| 4,879,839 | 11/1989 | Gago et al. | 47/57.6 |

FOREIGN PATENT DOCUMENTS 2167005 6/1990 Japan .................. 47/57.6

OTHER PUBLICATIONS

Chem-Tech. 1978, vol. 8: 284–287, *Coat seeds with polymers*. American Chemical Society.
D. A. Priestley et al., *Crop Science* (1986) 26:1252.

Primary Examiner—Howard J. Locker
Attorney, Agent, or Firm—Morrison & Foerster

[57] ABSTRACT

Coated organisms and particularly coated seeds are provided wherein the coating is comprised of one or more polymeric materials which form a coating having a temperature-dependent permeability with respect to a material such as water permeability. The polymeric materials used in making the coatings are relatively impermeable to the material such as water at cooler temperatures (less than optimum growth or germination temperatures) and relatively permeable at higher temperatures (at or greater than optimum growth or germination temperatures). The variable permeability of the coating prevents imbibition at lower temperatures and allows it at higher temperatures. Accordingly, coated seeds can be planted early in a planting season and undergo imbibition followed by germination under favorable moisture and temperature conditions.

15 Claims, 2 Drawing Sheets

Water Vapor Permeability of Films
as Measured by ASTM E-96-80

FIGURE 1
Water Vapor Permeability of Films as Measured by ASTM E-96-80

FIGURE 2
Effect of Coating on Seed Imbibition at 20 and 30°C

TEMPERATURE SENSITIVE SEED GERMINATION CONTROL

FIELD OF THE INVENTION

The present invention relates generally to controlling the growth of organisms such as the germination of agricultural seeds. More specifically, the invention relates to a range of organisms which are coated to control and/or temporarily suspend their early growth and most importantly to coated agricultural seeds wherein the coating is comprised of a crystallizable polymeric material which material has a water permeability which changes with temperature so that the coating allows the organisms to begin growth (seed to begin germination) under optimum conditions and prevents growth under non-optimal or adverse conditions.

BACKGROUND OF THE INVENTION

There are a number of factors which affect the ability of a farmer to produce high quality, high yield crops. Such factors include environmental conditions, land, and the types and the amounts of fertilizer used. Other factors which add considerably to the expense of raising crops include the type and amount of labor and machinery available to the farmer. Although all these factors have considerable influence on the quality and quantity of the yield, perhaps none of them is as important as the starting seeds. Accordingly, considerable efforts have been made to produce high quality inbred and hybrid seeds which produce high quality and high yield crops.

Advanced breeding techniques have made it possible to improve a number of characteristics of the resulting crops including characteristics such as crop quality, yield, disease and drought resistance. However, breeding techniques have limitations and require substantial periods of time in order to develop seeds which result in crops having all of the desirable characteristics for a particular area. Further, such breeding techniques often result in improving one characteristic to the detriment of another equally important characteristic.

When breeding seeds to produce crops in a temperate region such as the United States, the breeder must be conscious of factors such as changing temperatures, moisture and the photoperiod or amount of light available during the growing season. Seeds and cultivation practices are chosen in order to take the maximum advantage of each of the environmental conditions which the crops will be exposed to. Early planting of relatively short season varieties has become an important part of current agricultural practice.

Timing of the planting operation is frequently compromised by local weather conditions, equipment, and labor availability. Fields planted earliest in the spring will have a longer growing season but will be subjected to greater risk due to weather conditions and disease. Seeds planted later in the season are likely to provide lower yields due to a shorter growing period but are subjected to less risk. One of the most critical periods for crops is the period between the initial planting of the seed and germination. The significance of this period is explained further below.

In order for the seed to begin germinating it first must take in water; a process referred to as imbibition. Unless imbibition takes place, germination will not occur. Conversely, once imbibition begins, germination must occur within a relatively short period of time or the seed may become diseased and/or die. Accordingly, it would be desirable to have seeds which could be planted in the fall or early spring, which seeds would delay imbibition until the critical soil temperature range most favorable for germination is reached. Most seeds, however, will begin imbibition when water is present irrespective of the temperature of the soil. If the seed takes in sufficient amounts of water and the temperature remains cool, germination will be slow or will not occur and the seed will be more vulnerable to attack by diseases such as fungus.

U.S. Pat. No. 3,545,129 issued Dec. 8, 1970 to Schreiber et al. discloses a multiple coated seed. The seed includes an inner coating which is slowly permeable to water, an intermediate coating which is also semipermeable to water, and an outer coating which is substantially impermeable to moisture but is fissionable at a frost temperature. The object of the invention is to treat seeds with these multiple coatings so that the seeds may be planted in the fall and the advantages of early emergence in the spring can be obtained.

In U.S. Pat. No. 3,698,133 issued Oct. 17, 1972 to Schreiber, another multicoated seed is disclosed. The coated seed includes an inner porous coating which is permeable to water and an outer coating having controlled water permeability so as to control the water imbibition of the seed to the extent necessary to delay germination until environmental conditions are satisfactory for crop growth.

A somewhat different approach to providing coated seeds is disclosed within U.S. Pat. No. 4,779,376 issued Oct. 25, 1988 to Redenbaugh. In accordance with this disclosure, the seeds are combined with beneficial adjuvants and encapsulated in a saturated hydrogel matrix. The system provides specific adjuvants to the seeds in order to improve their growth.

It has been demonstrated that imbibitional chilling injury to cotton and soy beans can be reduced by coating such seeds with lanolin. Work carried out in this area is disclosed within D.A. Priestley and A.C. Leopold, "Alleviation of Imbibitional Chilling Injury by Use of Lanolin" *Crop Science* 26, 1252 (1986).

Each of the systems mentioned above have certain advantages and practicalities in that the coating of seeds does not add substantial expense as compared with other agricultural expenses such as the cost of land, machinery and labor. Although these systems can provide advantages, none of the systems optimize the concept of delaying germination by using a coating which changes permeability (and thus affects imbibition) based on temperature so as to result in a coated seed which begins imbibition and thus germination under the most favorable environmental conditions. Accordingly, there remains a need for a coated seed which obtains the advantages of delayed germination in a manner which is both temperature and moisture dependent. The present invention provides such a coated seed.

SUMMARY OF THE INVENTION

Various types of coated organisms, such as coated seeds, are provided wherein the coating is comprised of a polymeric material which has a temperature dependent permeability. The coating is relatively impermeable to a given material such as water, oxygen or carbon dioxide at cooler temperatures (e.g., less than 4° C.) and relatively permeable to water at higher temperatures (e.g., temperatures above about 4° C.). The variable permeability of the coating prevents imbibition at lower temperatures yet allows it at higher temperatures. Accordingly, coated seeds can be planted early in the planting season and undergo imbibition followed by germination under favorable moisture and temperature conditions. Organisms other than seeds can also be coated so as to temporarily suspend or control their growth and development at lower temperatures where the coating limits water, oxygen and/or carbon dioxide exchanges but allows growth at higher temperatures.

A primary object of the invention is to provide a coated organism such as a coated seed, which coating is a polymeric material having a temperature-dependent permeability with respect to water, oxygen and/or carbon dioxide making it possible for the coating to control and/or temporarily suspend growth.

Another object of the invention is to provide a coated organism such as a coated seed which is coated with a material capable of protecting the organism from moisture and pathogens (and thus keeping it under dormant conditions) until desirable soil temperatures are achieved.

An advantage of the present invention is that the coated seeds can be planted early in the planting season and not undergo imbibition even under moist soil conditions unless temperature conditions are favorable.

A feature of the present invention is that the polymeric coating material undergoes a temperature-dependent phase change which dramatically changes the water permeability of the material.

Another advantage of the present invention is that due to the impermeability of the coating with respect to water at lower temperatures, the seed will not take on water at lower temperatures and be subjected to diseases caused by fungi or other pathogens.

Yet another advantage of the present invention is that it provides for greater flexibility and efficiency with respect to the timing of seed planting.

Still other advantages of the present invention are greater flexibility in the use of the labor force due to an expanded planting period without substantial risk of a need for replanting due to imbibition at undesirably low temperatures.

Another object of the present invention is to increase the yield of early planted food and fiber crops due to optimum germination control.

An advantage of the present invention is a reduction in water-stress damage to seeds resulting in a more vigorous, disease and pest resistant planting.

Another object of the present invention is to reduce seed loss due to cool, damp conditions and further to reduce the planting rate and need for replanting, thus reducing overall production costs.

An important feature of the invention is that the coating provides for the elimination and/or reduction of a fungal attack to the ungerminated seeds and thus a reduction in the need for fungicides, thus reducing costs and providing an environmental benefit.

Still other advantages of the coated seeds of the invention is that they will allow early planting of the seeds so that the grower will be better able to utilize manpower resources and reduce scheduling conflicts with respect to manpower and equipment.

Another object of the invention is to effect germination timing by providing coated seeds which produce crops which mature in a more uniform manner (with respect to factors such as crop height) as compared to crops from uncoated seeds, thus allowing a larger percentage of the crop to be harvested at the same time.

Another object is to provide coated lyophilized organisms which are coated with a polymer which allows the organism to remain dormant and protected from pathogens until activation is desired.

Yet another object of the invention is to provide coated organisms in the form of coated, nematodes, bacteria, embryos, eggs, sprouts, buds, rhizobium and the like in a natural or lyophilized state.

Still another feature of the invention is that the coating with temperature-sensitive permeability can be used in combination with other like and different coatings alone or in combination with other materials such as fertilizers, insecticides, fungicides, plant growth regulators, herbicides and the like which enhance growth and/or protect the organism against harmful diseases and/or elements.

Another object is to provide for coated organisms of various types such as seeds, seedlings and embryos, which organisms are at or near the beginning of their growth cycle and have their growth temporarily suspended or controlled via a coating with temperature-dependent permeability.

These and other objects, advantages and features of the present invention will become apparent to those persons skilled in the art upon reading the details of the various coated seeds, seed coating formulations and usages as more fully set forth below.

DETAILED DESCRIPTION OF THE PREFERRED EMBODIMENTS

Before the present coated organisms such as coated seeds and polymeric materials used in making the coatings are described, it is to be understood that this invention is not limited to the particular coated organisms, coated seeds, polymers or methodologies described as such may, of course, vary. It is also to be understood that the terminology used herein is for the purpose of describing particular embodiments only, and is not intended to be limiting since the scope of the present invention will be limited only by the appended claims.

It must be noted, that as used in this specification and the appended claims the singular forms "a", "an", and "the" include plural referents unless the context clearly dictates otherwise. Thus, for example, reference to "a seed" or "a side-chain crystallizable polymer" includes a plurality of seed and polymers and statistical mixtures of such seeds and polymers, reference to "an organism" includes reference to one or more such organisms and reference to "the method of delayed seed germination" includes a plurality of such methodologies known to those skilled in the art and/or which will become known to them upon reading the present disclosure, and so forth.

The present invention makes possible the production of a variety of different types of coated organisms with the purpose of controlling and/or temporarily suspending growth at an early stage. However, the main focus of the invention is with respect to coated seeds. Accordingly, the invention will be described with respect to seeds—it being noted that other organisms (generally at an early stage of growth) can be coated with the same or similar polymer.

A given seed can be provided with a variety of different types of coatings depending upon the particular environment the seed is to be planted within and different coatings can be provided on different seeds depending on the particular needs of that seed within a given environment. The coating materials used in producing the coated seeds of the invention are comprised of intelligent polymers formed onto the seeds so as to match the needs of the seed. More specifically, the coating materials have permeabilities (most preferably water permeabilities) which are temperature dependent. The polymers are intelligent in that their permeabilities may be radically changed by changes in temperature related to optimum germination temperatures. By using different polymers and/or formulations, it is possible to create seed coatings which adjust to the growth needs of a particular seed within a given environment. Seeds may be encapsulated alone or in combination with a material such as a fertilizer, fungicide or insecticide, which material aids plant growth or aids in its protection from hostile organisms.

The seed coatings are designed so as to prevent imbibition during conditions unfavorable to germination, but which coatings allow imbibition during conditions most favorable to germination. For each specific type and variety of seed there is a minimum, optimum, and maximum temperature for germination. These temperatures are known and/or can be calculated by those skilled in the art. Information on germination temperature of some common commercial crops is given below.

germination can begin if the seed is subjected to large amounts of moisture at temperatures below the optimum germination temperature. Accordingly, the polymeric coatings provided on the coated seeds of the invention are designed so as to prevent imbibition at temperatures below the optimum temperature for germination, but which allow imbibition and thus germination at temperatures at or above the optimum temperature for germination.

Dry seeds such as dry soy bean seeds typically contain about 7% to 14% by weight of moisture in their dormant state. If the seed imbibes substantial amounts of water at cooler temperatures, the seed is likely to undergo what is referred to as "imbibitional chilling injury." Such injury can generally be avoided if the seed can be prevented from imbibing no more than from about 17 to about 24% by weight of water over a 14 day period at low temperatures. Accordingly, the coated seeds of the present invention are preferably provided with coatings which are, at lower temperatures, substantially impermeable to water, or at least do not allow the seed to imbibe more than about 24%, more preferably no more than about 17% by weight of water over a 14 day period during which it is subjected to moisture and a temperature below the minimum temperature for germination (e.g., below 16° C. for sweet corn).

It is clear that the coated seeds of the invention must allow imbibition at some point or the seeds will not germinate. Typically, a seed such as a soy bean requires a total water content of about 60% by weight in order to undergo optimum germination. Accordingly, the

TABLE 1

Soil Temperatures for Vegetable Seed Germination

| Minimum | | | | | |
|---|---|---|---|---|---|
| 34° F., 0° C. | 40° F., 4° C. | 50° F., 10° C. | | 60° F., 16° C. | |
| Endive | Beet | Parsley | Asparagus | Lima bean | Okra |
| Lettuce | Broccoli | Pea | Sweet corn | Snap bean | Pepper |
| Onion | Cabbage | Radish | Tomato | Cucumber | Pumpkin |
| Parsnip | Carrot | Swiss Chard | | Eggplant | Squash |
| Spinach | Cauliflower | Turnip | | Muskmelon | Watermelon |
| | Celery | | | | |

| Optimum | | | | | |
|---|---|---|---|---|---|
| 70° F., 21° C. | 75° F., 24° C. | 80° F., 27° C. | | 85° F., 29° C. | 95° F., 35° C. |
| Celery | Asparagus | Lima bean | Snap bean | Radish | Cucumber |
| Parsnip | Endive | Carrot | Beet | Sweet corn | Muskmelon |
| Spinach | Lettuce | Cauliflower | Broccoli | Swiss chard | Okra |
| | Pea | Onion | Cabbage | Tomato | Pumpkin |
| | | Parsley | Eggplant | Turnip | Squash |
| | | | Pepper | | Watermelon |

| Maximum | | | | | |
|---|---|---|---|---|---|
| 75° F., 24° C. | 85° F., 29° C. | 95° F., 35° C. | | 105° F., 41° C. | |
| Celery | Lima bean | Asparagus | Eggplant | Cucumber | Squash |
| Endive | Parsnip | Snap bean | Onion | Muskmelon | Sweet corn |
| Lettuce | Pea | Beet | Parsley | Okra | Turnip |
| Spinach | | Broccoli | Pepper | Pumpkin | Watermelon |
| | | Cabbage | Radish | | |
| | | Carrot | Swiss chard | | |
| | | Cauliflower | Tomato | | |

Source: H. T. Hartman and D. E. Kester, 1959, Plant Propagation: Principles and Practices (Prentice-Hall).

An important object of the present invention is to coat a seed so that it (and other seeds planted at the same time) will begin germination only when the temperature is above the minimum and preferably at the optimum temperature for germination. In general, favorable conditions for the germination of seeds include a temperature in the range of just above 0° C. to about 41° C., more preferably 21° C. to 35° C. By the term "just above 0° C." is meant a temperature at which (at atmospheric pressure) water will be liquid. However, coated seeds of the present invention will preferably allow the seed to imbibe 60% by weight of water over a 15 hour period when the temperature is favorable to the germination of the seed. If imbibition begins at higher temperatures and then the temperatures get cooler, the polymers can reverse their water permeability and halt further imbibition.

Coated seeds of the invention can be designed such that germination will take place at different temperatures and thus at different times, e.g., several centigrade degrees and days apart. This will result in the crops maturing at different times. This will allow the farmer to make more efficient use of equipment and/or labor resources. In accordance with yet another embodiment, the germination of male and female plants can be timed so that they occur at times which facilitate or prevent fertilization, depending on the result desired.

The variability in the rate of individual seed germination is small at optimal temperatures and correspondingly great at suboptimal temperatures. This means that the emergence and growth of seeds germinated at suboptimal temperatures is subject to great variability—for example, oats at 7° C. germinate at times varying from 6 to 15 days (90% germination), while oats at 15° C. achieve 90% germination between 4 and 6 days, a spread of only 2 days.

Coated seeds of the invention can be designed such that the coating temperature is set to correlate with that point in the distribution of soil temperature versus seed percent germination per day such that the maximum percent germination occurs in the shortest time period. This will result in crops that have a uniform stand throughout their growing cycle and which can be harvested over a shorter time than by allowing conventional (or natural) germination to occur. This benefits the farmer by allowing him to harvest his crop with fewer trips across the field, and to plan the timing of his harvest to fit his equipment and processing needs.

The intelligent polymers which are temperature responsive are comprised of crystallizable polymers which are designed and formulated so as to provide a material which is dynamic in nature, that is, changing depending upon the temperature to which it is exposed. The polymeric materials are designed so that they are substantially impermeable to a given material such as oxygen, carbon dioxide or water at a temperature below a given phase transition point and highly permeable to the material at a temperature above the transition temperature. Polymers of the invention are relatively hydrophobic and will take up less than 5% of water by weight. They have a first order transition temperature of 41° C. or less and have permeabilities four to ten or more times greater at a temperature at or above the transition temperature than below that temperature.

Accordingly, an essential feature of the present invention is using crystallizable polymers as barriers to a material such as water, which barriers are temperature responsive and variable in their permeability. These polymers are most preferably side-chain crystallizable polymers which are distinct from most other polymers in that when they are formed into a coating on a seed, the coating will possess a characteristic of having a significant variability in permeability as a function of temperature. These temperature-dependent permeation characteristics make it possible for the coated seeds of the present invention to provide temperature-sensitive water permeability which can be turned "on" and "off" by temperature variation and thereby use temperature variation to effectively control the time of seed germination.

A particular type of crystallizable polymers, i.e., side-chain crystallizable polymers, are described within the "Journal of Polymer Science": Macromolecule Reviews (1974) 8:117 and "Journal of Polymer Science": polymer Chemistry Addition (1981) 19:1871-1873.

Side-chain crystallizable polymers are sometimes referred to as "comb-like" polymers and are available commercially. These polymers are generally reviewed in the "Macromolecular Review" article referred to above. However, the use of such polymers in connection with seed coatings and germination control is not heretofore known.

Seed coatings of the present invention are comprised of polymers which can provide temperature dependent water permeability. The structure and thickness of the coatings are such that they maintain their integrity below a given temperature while being formulated so as to provide essentially no interference with seed germination above a given temperature after imbibition. The crystallizable polymers are chosen and formulated so that they: (1) can form seed coatings which retain their shape and structure and do not freely flow below a given temperature range which temperature is generally too cool for optimum germination; (2) exhibit one or more phase transitions at phase transition temperature points; (3) have substantially greater permeability to water at temperatures equal to or greater than a selected temperature than at temperatures below the selected temperature; and (4) are structurally positioned so as to regulate the flow of a material such as water between an outside environment and the seed whereby water flow between the outside environment and the seed is regulated by changing the temperature and thereby changing the permeability of the material with respect to water and thus controlling the timing of the germination of the seed. The crystallizable polymers are preferably side-chain crystallizable polymers and more preferably cross-linked or immobilized side-chain crystallizable polymers.

Regarding feature (1) above, the polymer may be combined with other polymers to aid structural integrity. With respect to features (2) and (3) the phase change preferably takes place in the range of 5° C. to 40° C., more preferably 18° C. to 30° C. at which temperature the permeability increases fourfold, preferably tenfold or more as compared to the permeability below the phase transition temperature.

The polymers can be applied to seeds or other organisms of the invention by one or more means known to those skilled in the art. For example, the polymers can be applied by pan coating, direct polymerization, solvent evaporation, spray drying procedures, or u.v. curing. These procedures can be used to provide one or more layers of coating, which coating separates an inside environment containing the seed or other organism from the outside environment.

Crystallizable polymers useful in this invention include any polymer meeting the following criteria:
a) Melting point from just above 0° C. to 41° C.
b) Water uptake less than 5%.
c) Heat of fusion ≥ 10 J/g.
d) Molecular weight ≥ 5,000 daltons.

Representative polymers meeting these requirements include polycaptrolactone, polyethylene sebacate, polyethylene adipate, polytetrahydrofuran homo- and co-polymers, polydiethyl siloxane, cis polyisoprene, cis poly-1,4-cyclohexylenedimethylene dodecanedioate, polydecamethylene disulfide, poly-dodecamethylene adipamide, poly-tetramethylene succinate, poly-trimethylene adipate, and the like.

A preferred class of polymers useful in coating seeds are side-chain crystallizable polymers of the following general structural formula:

wherein W and X are each respectively a first and a second monomer unit, which monomer unit may be any molecular moiety connectable to an adjoining molecular moiety (i.e., polymerizable), Y and Z are each independently a backbone monomer unit which may be any molecular moiety or atom, each S is independently a linking group or spacer unit and is optionally present, Cyt and Cy are each independently a crystallizable moiety connected to the respective backbone directly or via the spacer unit, and a, b, c, d and e are each, independently, integers ranging from 0-1,000 with the proviso that sufficient Cyt and Cy are present so as to provide a Mw which is equal to or greater than twice the sum of the Mws of W, X, Y and Z, and further wherein the polymers have a heat of fusion ($\Delta Hf$) of at least five joules/gram, and preferably about ten joules/gram. It is understood that when the variables a, b, c and d are greater than 1, the monomer units W, X, Y and Z can be repeating units or a mixture of different monomer units. For example, if a is 100, W could be a mixture of styrene, vinyl acetate, acrylic acid, methyl styrene and hexadecyl acrylate in ratios of 5:5:2:5:83. Thus, any of the monomer units W, X, Y and Z can be mixtures of polymerizable monomers. The resulting polymer must be crystallizable and is preferably side-chain crystallizable, and more preferably possesses the characteristics indicated in this disclosure.

The backbone of the polymer (defined by W, X, Y and Z) may be any organic structure (aliphatic or aromatic hydrocarbon, ester, ether, amide, etc.) or an inorganic structure (sulfide, phosphazine, silicone, etc.). The spacer linkages can be any suitable organic or inorganic unit, for example ester, amide hydrocarbon, phenyl, ether, or ionic salt (for example a carboxylalkyl ammonium or sulfonium or phosphonium ion pair or other known ionic salt pair). The side-chains (defined by S, Cyt and Cy) may be aliphatic or aromatic or a combination of aliphatic side-chains of at least 10 carbon atoms, fluorinated aliphatic side-chains containing at least 6 carbons, and alkyl styrene side-chains wherein the alkyl contains from 8 to 24 carbon atoms.

The length of the side-chain moiety is usually greater than 5 times the distance between side-chains in the case of acrylates, methacrylates, vinyl esters, acrylamides, methacrylamides, vinyl ethers and alpha olefins. In the extreme case of a fluoroacrylate alternate copolymer with butadiene, the side chain can be as little as 2 times the length as the distance between branches. In any case, the side-chain units should make up greater than 50% of the volume of the polymer, preferably greater than 65% of the volume. Co-monomers added to a side-chain polymer usually have an adverse effect on crystallinity. Small amounts of various co-monomers can be tolerated, usually up to 10 to 25 volume percent. In some cases it is desirable to add a small amount of co-monomers, for example cure site monomers such as acrylic acid, glycidal methacrylate, maleic anhydride, amino functional monomer and the like.

Specific examples of side-chain crystallizable monomers are the acrylate, fluoroacrylate, methacrylate and vinyl ester polymers described in J. Poly. Sci. (1972) 10:3347; J. Poly. Sci. (1972) 10:1657; J. Poly. Sci. (1971) 9:3367; J. Poly. Sci. (971) 9:3349; J. Poly. Sci. (1971) 9:1835; J.A.C.S. (1954) 76:6280; J. Poly. Sci. (1969) 7:3053; Polymer J. (1985) 17:991, corresponding acrylamides, substituted acrylamide and maleimide polymers (J. Poly. Sci., Poly. Physics Ed. (1980) 18:2197; polyalphaolefin polymers such as those described in J. Poly. Sci.: Macromol. Rev. (1974) 8:117–252, and Macromolecules (1980) 13:12, polyalkylvinylethers, polyalkylethylene oxides such as those described in Macromolecules (1980) 13:15, alkyphosphazene polymers, polyamino acids such as those described in Poly. Sci. USSR (1979) 21:241, Macromolecules (985) 18:2141, polyisocyanates such as those described in Macromolecules (1979) 12:94, polyurethanes made by reacting amine- or alcohol-containing monomers with long-chain alkyl isocyanates, polyesters and polyethers, polysiloxanes and polysilanes such as those decried in Macromolecules (1986) 19:611 and p-alkylstyrene polymers such as those described in J.A.C.S. (1953) 75:3326 and J. Poly. Sci. (1962) 60:19.

The main properties of crystallizable polymers that are believed to affect its permeability properties are: melting point, glass transition temperature, crystallinity, crosslink density, and side-chain structure (if any). Melting point will be chosen to correlate a particular temperature at which water permeability is desired. For instance, if one desires the seed coatings to have a water permeability at 25° C. or above, a crystallizable polymer having a melting point of approximately 25° C. is chosen. The percent crystallinity of the polymer (below its melt point) will typically be in the range of 10% to 55%, more usually 15% to 50%. In general, the higher the crystallinity, the greater the change in permeability exhibited at phase transition. As indicated below, the crosslink density will typically be in the range of about 0.1 to 1 or more. Crosslinking in general decreases permeability at melt. At such crosslink densities, however, the decrease is not sufficient enough to render the permeability of the polymer substantially insensitive to temperature but is sufficient to significantly reduce the fluidity of the polymer at temperatures above the melt temperature. As indicated above, the chemical structure of the polymer may vary widely. The permeability of the polymer will typically be at least twofold and more usually at least fivefold higher at or near its melting point than at temperatures below its melting point.

Polymers are statistical mixtures of units all of which vary, one from another, over a range. Accordingly, properties such as melting point, glass transition temperature, permeability changes and the like do not generally take place at a given point but rather over a range. The polymers of the invention are designed such that the temperature range where the rate of change is greatest corresponds to the desired permeability change point as closely as possible.

Polymers used in making coated organisms of the invention have a first-order transition temperature or melting point in the range of from just above 0° C. to 41° C. in most cases, but at or below the optimal germination temperature when used with seed. By the terms "melting point" or "first order transition" as used herein is meant the temperature at which an equilibrium process causes certain portions of the polymer, initially aligned in an ordered array, to become disordered. By the term "freezing point," is meant the temperature at which an equilibrium process causes those certain portions of the polymer, initially disordered, to become aligned in an ordered array. Preferably, the first-order transition temperature or melting point will be in the range of from about just above 0° C. to 41° C., more preferably in the range of about 21° C. to 35° C. It is preferred that melting occur rapidly, i.e., over a relatively narrow temperature range, less than about 10° C., preferably less than about 5° C.

The coating assembly is substantially nonpermeable up until the transition temperature is reached, and becomes permeable upon reaching that temperature. (Melting of most polymers can be monitored with the aid of a differential scanning calorimeter, or "DSC." Melting generally takes place over about a 10C.° range, and onset of permeability occurs at the onset of melting. The melting "point" of the polymers as described herein is taken as the endotherm peak temperature when measured at a rate of 10C.°/min. The highest permeability occurs when the temperature is high enough to effect complete melting.)

For use as a temperature-sensitive organism (seed) coating in accordance with the invention, the crystallizable polymer is in a form in which it retains its shape and does not freely flow at its melting temperature (i.e., the temperature/temperature range at/over which the side chains undergo a phase change from crystalline to amorphous). Otherwise, the polymer would not remain in its intended location (interposed between the organism (or seed) and the outside environment) and would be displaced or dispersed elsewhere due to gravitational or other forces. In this regard, in many embodiments the crystallizable polymer interfaces directly with the environment (its surface contacts the environment) and would be free at its melt temperature to disperse into the environment.

In one such form, the crystallizable polymer is crosslinked to a degree such that it becomes viscoelastic at its "melt" temperature but is not so fluid that it readily flows in response to mild forces. Accordingly, the term "crystallizable polymer" is used to describe polymers which are resistant to flow above their melting points. Resistance to flow is obtained by providing sufficient crosslinking density that the material has an elastic modulus above the melting point of the polymer. Generally, the crosslink density of a polymer is described as the number of crosslinks per weight average molecular weight. For example, a polymer having an average molecular weight of 125,000 and having an average of 1 intermolecular crosslink per polymer chain is stated to have a crosslink density of 1. In order for a crystallizable polymer to resist flow above the melt, it is desirable to have a crosslink density greater than about 0.1, preferably greater than 0.5, and most preferably greater than 1. It is not necessary for all of the polymer chains in a material to be crosslinked and a high gel content is not generally necessary unless the application requires great solvent resistance. Generally crosslinking beyond about 1 to 10 mole percent is not necessary under normal circumstances and excessive crosslinking can result in decreased crystallinity and impaired performance. The optimal crosslink density for a given polymer will depend to a large extent on the molecular structure and repeat unit size, larger repeat unit size matching generally well with generally increased cross-linking density. In terms of mole percent the crosslinking will normally be in the range of 0.01 percent to 10 mole percent. The crosslinked polymers will normally have a heat of fusion of at least about 10 Joules/g, more usually at least 20 Joules/g.

A variety of methods are available to produce crosslinked crystallizable materials for use in producing the coated seeds of the invention. A network copolymer can be prepared by polymerizing a crystallizable monomer and a multifunctional monomer either in one or two steps. A one step process may be used to form a coating in place, while a two step process is useful where an intermediate processing step is necessary. A variety of multifunctional monomers (di, tri or multifunctional acrylic or methacrylic esters, vinyl ethers, esters or amides, isocyanates, aldehydes, epoxies and the like) are known in the art. These multifunctional monomers can be used on a one or two step process depending on the desired result. Ionizing radiation, for example, beta or gamma radiation, visible or ultraviolet light, peroxides, silanes or similar cure agents, can be used to crosslink a preformed crystallizable polymer with or without added co-monomers. Ionic crosslinks can be formed by, for example, reacting an acidic polymer site with a di- or trivalent metal salt or oxide to produce a complex which serves as a crosslink site. Likewise, organic salts or complexes can be prepared by methods known in the art.

Effective crosslinking may also be obtained by physical methods. For example, a block copolymer of a crystallizable polymer and a second polymer which exhibits a glass transition or melting point higher than the crystallizable polymer may be prepared wherein the entire mass exhibits mechanical stability above the melting point of the side-chain crystallizable polymer but below the transition of the second polymer.

It is also possible to disperse (blend homogeneously) the crystallizable polymer at high volume loadings (e.g., greater than 20%, usually 50% to 90%) in a continuous or co-continuous phase matrix material that is impermeable to water. At such high volumes, there are sufficient amounts of the dispersed crystallizable polymer to form continuous paths of crystallizable polymer through the matrix. In effect, then, such dispersions function to provide variable reduced water permeability.

In a similar manner, a crystallizable polymer may be immobilized by creating a second polymer within or throughout the crystallizable polymer by polymerization and phase separation. For example, a noncrosslinked crystallizable polymer may be heated above its melting point with a second monomer or monomer mixture and the monomer(s) caused to polymerize. In this case a supporting polymer network can be created in situ. In this case it is desirable that the second polymer created be at least partially insoluble in the crystallizable polymer, yet be of a sufficient structure to bind the crystallizable polymer into a stable form above its melting point.

Coating Designs Based on Water Permeability Characteristics

The above disclosure provides substantial information with respect to the various monomer units, polymeric structures and formulations which can be utilized in connection with producing side-chain crystallizable polymers for the coated seeds of the invention. This disclosure can be used by those skilled in the art in combination with the following water permeability characteristics in order to produce coated seeds which will have coatings with water permeability characteristics such that the seed will undergo germination under the most desirable environmental conditions.

The permeability of any film with respect to water and water vapor is a fundamental property which is defined by the mass flux of water vapor through the film per unit area per unit thickness of the film per unit humidity gradient. Standard methods for the measurement of water vapor permeability may be found in the literature. (For example, reference is made to ASTM Specification E-96-80, "Standard Test Methods for Water Vapor Transmission of Materials" and ASTM Specification D-1643, "Standard Method of Test Moisture Vapor Permeability of Organic Coating Films", both disclosures being incorporated herein by reference in their entirety to disclose such methods of testing films).

In that an object of the present invention is to provide coated seeds which have water permeabilities which vary with temperature, the water permeability of the coatings must be tested at different temperatures. The water permeability in the polymers can, of course, be determined over any temperature range. However, in that the present invention is generally only concerned with water permeability over a relatively narrow range, it is generally only necessary to test the water permeability of the polymers over a range such as about 0° C. to 50° C. If after such testing it is determined that the coating would be relatively impermeable to water vapor at temperatures below the optimal germination temperatures (e.g., 0° C. to below 18° C.) for the seed and relatively permeable to water vapor at temperatures at or above the optimal germination temperatures (e.g., 18° C. to about 40° C.), then the polymer would provide a useful coating in connection with the coated seeds of the present invention.

EXAMPLES

The following examples are put forth so as to provide those of ordinary skill in the art with a complete disclosure and description of how to make the side-chain crystallizable polymers and formulate them into compositions for producing the coated seeds of the present invention and are not intended to limit the scope of what the inventors regard as their invention. Efforts have been made to ensure accuracy with respect to numbers used (e.g., amounts, temperature, etc.) but some experimental errors and variation should be accounted for. Unless indicated otherwise, parts are part by weight, temperature is in degrees centigrade, and pressure is at or near atmospheric.

EXAMPLES (WATER PERMEABILITY TESTS)

Standardized test procedures can be used to screen polymer formulations to be used in producing coated seeds of the invention. Water permeability cups (ASTM D-4493) can be obtained from a commercial source (Paul Gardner Company) and used without modification. The polymeric formulations to be tested should be formed into films, and used as barriers in these cups. Small amounts of deionized water are introduced into each cup, the film is applied to the lip and the cups sealed. The cups are placed in a desiccator containing a small amount of saturated solution of lithium chloride. The solution is maintained a constant relative humidity within the desiccator within the range of about 11.0±0.5% over a temperature range of 10° C. to 50° C. (for details refer to ASTM E-104-85 "Standard Practice for Maintaining Constant Relative Humidity by Means of Aqueous Solutions", incorporated herein by reference to disclose such testing methods).

Figure 1:
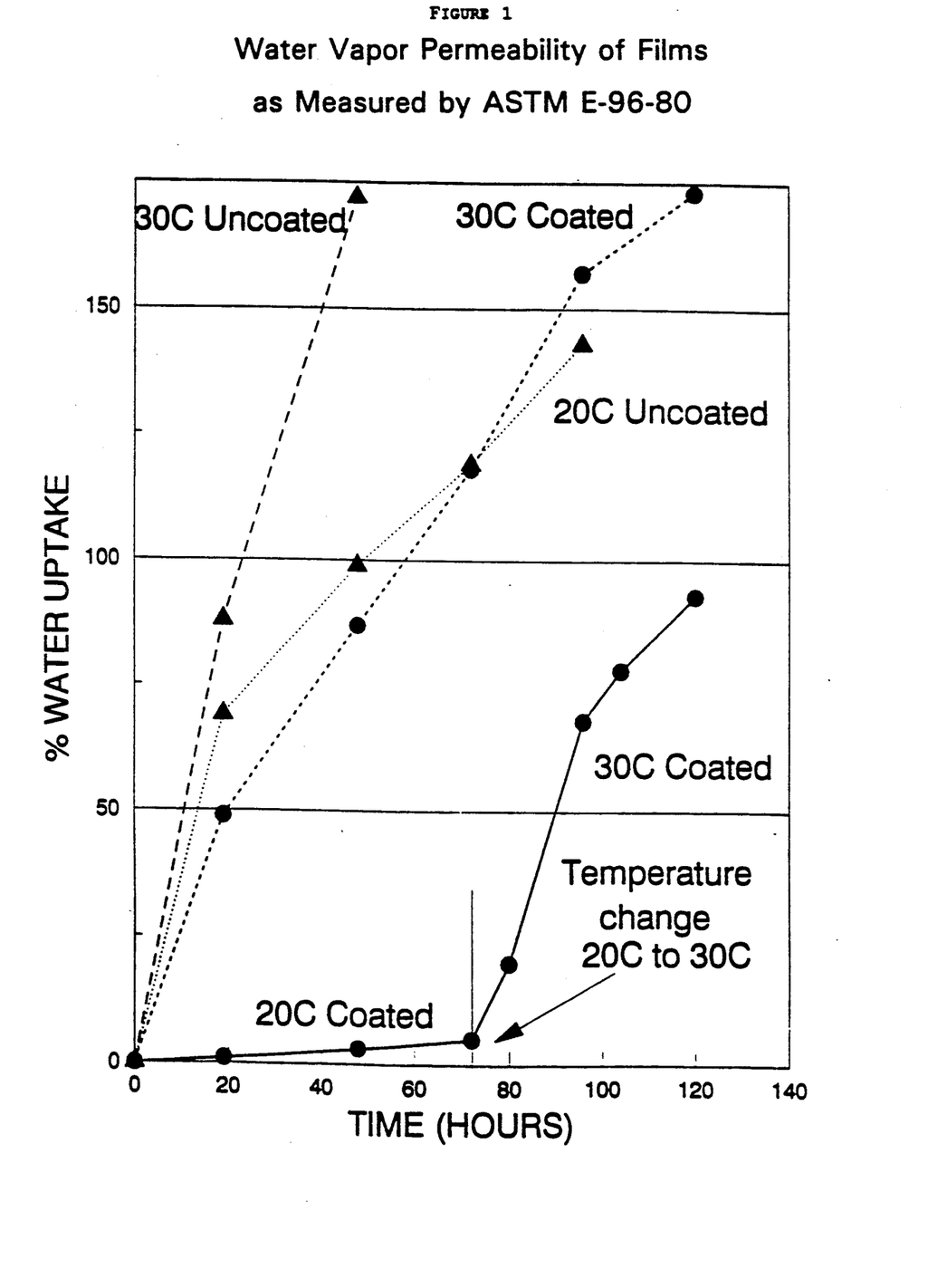
FIG. 1 is a graph of water vapor permeability.

Using the above-described procedures, the polymer described in detail in Example 1 was made into the form of a film and tested with respect to water vapor permeability at temperatures of 10° C., 20° C., 30° C. and 37° C. Conservative estimates of the ratio of water permeabilities, S, over the temperature range of 20° C. to about 32° C. is around 20. Based on the results obtained and shown within FIG. 1, it was postulated that it would be possible to create coated seeds which provided a water permeability "S" factor in the range of about 2 to about 100. Such a range of water permeability over the desired temperature range would provide coated seeds of the type necessary to carry out the objects, advantages and features of the invention. More specifically, such coatings would protect the seeds from imbibitional chilling injury at lower temperatures and allow water permeation and unobstructed germination at higher temperatures.

General Procedure for Selecting and Formulating Polymers

Based on the water permeability testing conducted, polymers were prepared. The compositions were selected based on their known differences in hydrophilic character and "switch temperatures," that is, phase transition temperatures at which the polymers become permeable to water when they were not permeable at the lower temperatures. Uncoated seeds (comparative Examples) and seeds coated with these polymeric compositions were screened for their ability to control imbibition in response to changing temperature.

Candidate polymer compositions were dissolved in ethylacetate or ethylacetate:heptane (1:1) mixtures to yield solutions of viscosity of less than 2000 centipoise suitable for coating. Bush bean seeds were tumble coated with dissolved polymers to achieve uniform coatings and allowed to dry at about 40° C. for about one hour. The quality of the seed coating was confirmed by visual inspection with a stereoscope. Coated seeds and uncoated control seeds were weighed and placed on water-saturated filter paper in a petri dish and incubated first at 20° C. and then at 30° C. in plant growth chambers with a 12 hour photo period. Water imbibition was determined gravimetrically over a period of 5 days or until seed coatings failed. It was generally observed that all coatings using the crystallizable polymers tested provided significant reduction in imbibition rates at lower temperatures with the less polar polymers offering greater amounts of protection.

The results in the above-described testing provide valuable information to those skilled in the art when used in combination with the above general description of the side-chain crystallizable polymers and water permeability testing in order to produce coated seeds of the invention.

ACTUAL AND COMPARATIVE EXAMPLES OF COATED SEEDS

Example 1

Pentadecyl acrylate was prepared by esterification of acrylic acid with 1-pentadecanol under standard conditions. Crude monomer was recrystallized from three volumes of ethanol and dried in vacuo. Ten grams of pentadecyl acrylate was dissolved in 20 ml of oxygen free ethylacetate containing 0.10 grams of azobisisobutylnitrile (hereinafter AIBN) and stirred in a sealed bottle maintained at 60° C. for 24 hours. The resulting polymer was isolated by precipitation into cold ethanol and dried in vacuo. Analysis of the polymer showed it to have a first order transition temperature of 29° C., a heat of fusion of 59 J/g and a molecular weight of about 175,000 in an uncured state.

Two grams of the polymer obtained was dissolved in 5 ml of a 1:1 mixture of heptane and ethylacetate. Bush Bean seeds (Lilly Miller) were placed in a small vial and mixed with enough polymer solution to thoroughly wet the seeds. Coated seeds were then placed on a weighing paper and allowed to dry thoroughly. Visual inspection showed the seeds to be covered with a thin continuous and adherent film of polymer.

Coated and uncoated seeds were placed onto wet filter paper inside petri dishes and incubated at 20° C. and 30° C. in an incubator equipped with a 12 hour photoperiod. The filter paper was kept wet by addition of water and the weight of the seeds was recorded daily and is reported as average percent water imbibition (Weight at Time T-Weight at Time O/Weight at Time O) in Table I.

TABLE 2

| Water Imbibition of Coated and Uncoated Seeds | | | | |
|---|---|---|---|---|
| Time (Hours) | 20 C. Uncoated | 20 C. Coated | 30 C. Uncoated | 30 C. Coated |
| 19 | 63 | <1 | 88 | 51 |
| 42 | 99 | 3 | 174 | 87 |
| 66 | 119 | 5 | 222 | 115 |
| | | move to 30 C. | | |
| 24 | | 68 | | |
| 50 | | 93 | | |

Figure 2:
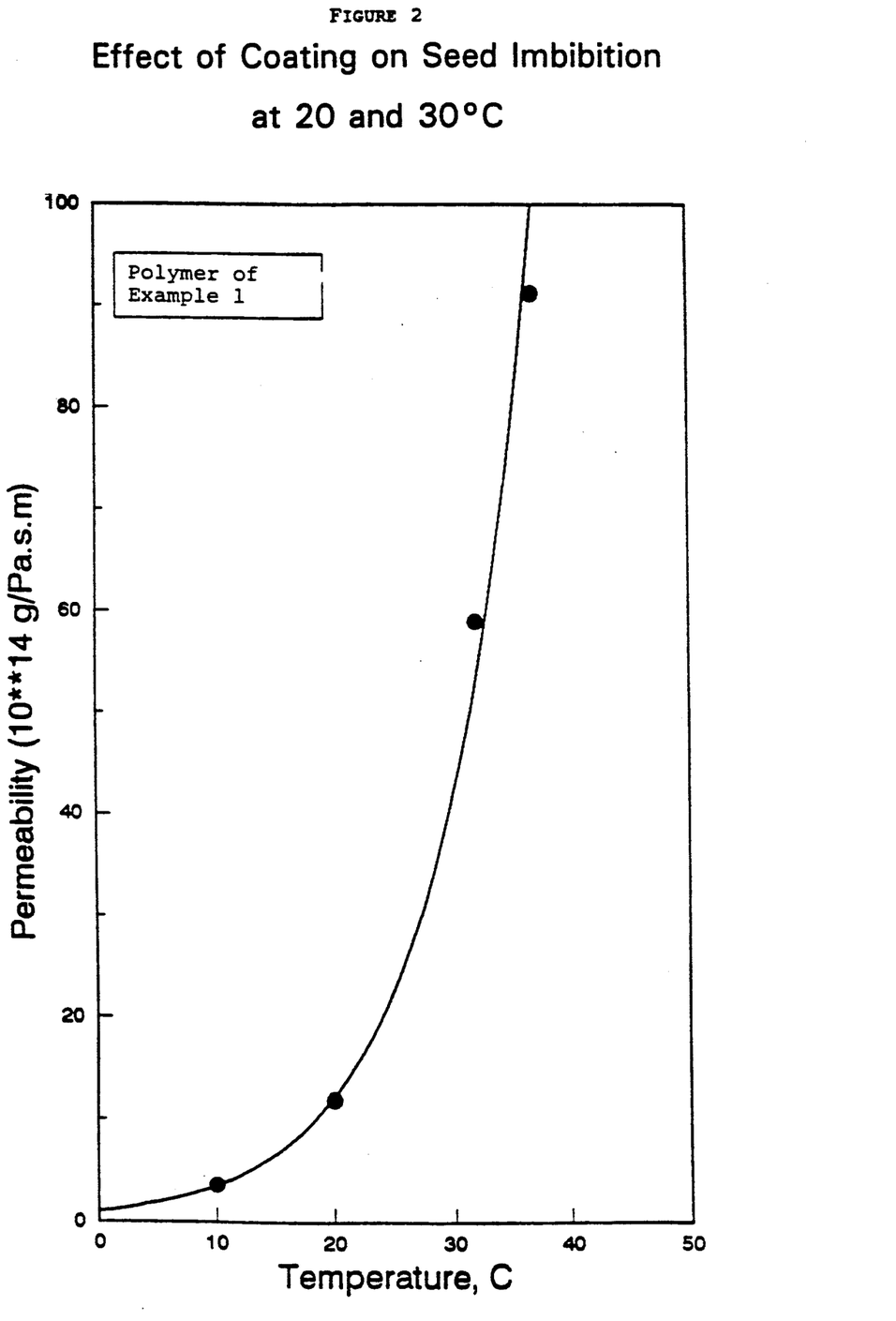
FIG. 2 is a graph showing the imbibition rates of coated and uncoated seeds in response to different temperatures.

This data is represented graphically in FIG. 2.

Example 2

Bush Peas (Novella II), Cotton Seed (Stoneville 504) and Pop Corn seeds were coated with polymer and incubated at 20° C. and 30° C. along with uncoated controls as in Example 1. Germination results are given in Table 3.

TABLE 3

| Germination Comparison of Coated and Uncoated Seeds | | | | |
|---|---|---|---|---|
| | | Time | Number Germinated | |
| Type of Seed | Temperature | (Days) | Uncoated | Coated |
| Bush Peas | 20 C. | 3 | 6/6 | 0/6 |
| | 30 C. | 3 | 6/6 | 5/6 |
| Cotton | 20 C. | 3 | 4/7 | 0/7 |
| | 30 C. | 3 | 6/7 | 5/7 |
| Pop Corn | 20 C. | 4 | 7/7 | 1/7 |
| | 30 C. | 4 | 7/7 | 7/7 |

Example 3

The polymers of Table 3 were prepared by solution polymerization at 60° C. as specified and isolated by precipitation into cold ethanol.

TABLE 4

| Polymer | Monomers (grams) | Solvent (ml) | AIBN (g) | Time (Hr) |
|---|---|---|---|---|
| 1 | C18 MA, 10 AA, 0.5 | Toluene 15 Ethanol 12 | 0.09 | 18 |
| 2 | Rocryl 330, 20 | Toluene 35 | 0.09 | 8 |
| 3 | C16 A, 14.5 | Toluene 30 | 0.12 | 12 |

TABLE 4-continued

| Polymer | Monomers (grams) | Solvent (ml) | AIBN (g) | Time (Hr) |
|---|---|---|---|---|
| | AA, 0.75 | | | |

MA = methacrylate
AA = acrylic acid
A = acylate
Rocyl = C18 MA from Rhom & Haas

Bean seeds were solution coated as in Example 1 and dried. Uncoated and coated seed were weighed and placed into vials of water maintained at 10° C. Seeds were periodically removed, blotted dry and weighed. Results are given in Table 5.

TABLE 5

| Effect of Various Polymer Coatings on Low Temperature Water Imbibition of Bean Seeds | | |
|---|---|---|
| Polymer Coating | Time (Minutes) | % Water Uptake |
| Uncoated | 30 | 60 |
| | 100 | 75 |
| 1 | 30 | 5 |
| | 100 | 25 |
| 2 | 30 | 14 |
| | 100 | 52 |
| 3 | 30 | 3 |
| | 100 | 5 |

Thus, it can be seen that a variety of water uptake rates can be readily engineered with the materials of this invention to meet the various needs of many different types of seeds.

COMPARATIVE EXAMPLES

Polyvinyl acetate (PVA) (medium molecular weight, Aldrich Chemical) and polymethylmethacrylate (PMMA) (molecular weight 90,000, Polysciences) were dissolved into sufficient ethylacetate to produce 17% W/V solutions. Bush bean seeds were coated with polymer, allowed to dry and incubated at 20° C. and 30° C. on wet filter paper. Results are given in Table 5.

TABLE 6

| Coating | Temperature | Time | # Swollen* | # Sprouted |
|---|---|---|---|---|
| PVA | 20 C. | 27 hrs | 7/8 | 0/8 |
| | | 48 hrs | 7/8 | 0/8 |
| | | 64 hrs | 8/8 | 0/8 |
| | 30 C. | 27 hrs | 7/8 | 0/8 |
| | | 48 hrs | 8/8 | 0/8 |
| | | 64 hrs | 8/8 | 2/8 |
| PMMA | 20 C. | 12 hrs | 4/4 | 0/4 |
| | | 21 hrs | 4/4 | 0/4 |
| | | 38 hrs | 4/4 | 1/4 |
| | 30 C. | 12 hrs | 4/4 | 0/4 |
| | | 21 hrs | 4/4 | 0/4 |
| | | 38 hrs | 4/4 | 0/4 |
| NONE | 20 C. | 27 hrs | 8/8 | 0/8 |
| | | 48 hrs | 8/8 | 5/8 |
| | | 64 hrs | 8/8 | 6/8 |
| | 30 C. | 27 hrs | 8/8 | 5/8 |
| | | 48 hrs | 8/8 | 6/8 |
| | | 64 hrs | 8/8 | 6/8 |

*Indicates greater than 50% water uptake

As can be seen, the polymers used to produce the coated seeds of the comparative examples are not effective for temperature activated germination control. Rather, existing polymers allow relatively rapid water uptake even at low temperatures and may exhibit a retarding effect on sprouting at the desired temperature. While not wishing to be bound to any particular theory, it may be that polymers such as PVA and PMMA exhibit MVTR values that are too high at low temperatures and may not be high enough at warmer temperatures. Also, it is to be expected that a polymer such as PMMA and PVA may exhibit a mechanical restraining effect on water uptake and germination at both temperatures due to the relatively high modulus of the polymer.

Bush bean seed were coated with 2% by weight of Polyvinyl acetate, Polymethylmethacrylate and polypentadecyl acrylate as in the above examples and incubated at 20° C. and 30° C. Water uptake was determined after 43 and 25.5 hours respectively as indicated in Table 6.

TABLE 7

| Water Uptake of Seeds Coated with Various Polymers | | | |
|---|---|---|---|
| Polymer | Temperature | Time (hrs) | Water Uptake (%) |
| None | 20 C. | 43 | 88.3 |
|  | 30 C. | 25.5 | 102.6 |
| PVA | 20 C. | 43 | 16.8 |
|  | 30 C. | 25.5 | 11.1 |
| PMMA | 20 C. | 43 | 108.9 |
|  | 30 C. | 25.5 | 94.5 |
| C15 A | 20 C. | 43 | 1.3 |
|  | 30 C. | 25.5 | 66.4 |

To obtain temperature controlled germination it is important that the ratio of the rate of water uptake at the (desired) upper temperature to the rate of water uptake at the lower temperature (protected state) be large. This ratio R, (Rate 30/Rate 20) can be readily calculated for various polymers as shown in Table 7.

TABLE 8

| Polymer | R Value |
|---|---|
| Uncoated | 1.96 |
| PVA | 1.11 |
| PMMA | 1.4 |
| C15 A | 86.1 |

Most of the comparative polymers tested yielded R values worse than uncoated seeds. The crystallizable polymers of the current invention provide R values much greater than uncoated seeds.

Example 4

The following example is put forth to provide a specific example of a non-sidechain crystallizable polymer which can be used as a coating in this invention.

A polymer with oxygen switching properties in the range of 30° C. was prepared by copolymerizing tetrahydrofuran and 2-methyltetrahydrofuran. The resultant linear polymer had a molecular weight of 54,000 and a melting point of 281° C. A film (0.001") thick was laminated onto a microprous propropylene support. Oxygen reported in Table 9.

TABLE 9

| | Permeation (normal units) | | |
|---|---|---|---|
| Film # | 5 C. | 20 C. | 30 C. |
| 1 | 3750 | 6730 | 25,800 |
| 2 | 4780 | 7120 | 26,400 |

It was observed that the oxygen permeability increased dramatically at the melting point of the polymer. The melting point (and the resulting permeability change) can be selected by varying the copolymer composition. A variety of chain extended polyurethanes can be prepared from crystallizable polyethers such as polytetrahydrofuran, polyethyleneoxide, their copolymers and the like. Resistance to flow above the soft segment melting point may be attained by reaction with, for example, di or multifunctional isocyanates.

While the present invention has been described with reference to specific embodiments thereof, it should be understood by those skilled in the art that various changes may be made and equivalents may be substituted without the departing from the true spirit and scope of the invention. In addition, many modifications may be made to adapt a particular situation, material, composition of matter, process, process step or steps, or seed to the objective, spirit and scope of the present invention. All such modifications are intended to be within the scope of the claims appended hereto.

What is claimed is:

1. A coated seed, comprising:
a seed; and
a coating which encloses and separates the seed and a surrounding inside environment from an outside environment, the coating being comprised of a crystallizable polymer coating impermeable to water at a temperature below a phase-transition temperature of the polymer to the extend that germination of the seed is prevented due to lack of water and permeable to water at a temperature above the transition temperature whereby the water permeability of the coating is increased five fold or more above the phase transition temperature as compared with the water permeability below the phase transition temperature.

2. The coated organism as claimed in claim 1, wherein the phase transition temperature is in the range of about 0° C. to about 41° C.

3. The coated organism claimed in claim 2, wherein the phase transition temperature is in the range of about 21° C. to about 35° C.

4. The coated organism as claimed in claim 1, wherein the polymer is a side-chain crystallizable polymer.

5. The coated organism as claimed in claim 1, wherein the polymer is a polyether.

6. The coated organism as claimed in claim 1, wherein the polymer is a homo- or co-polymer of tetrahydrofuran.

7. The coated organism as claimed in claim 1, wherein the polymer is a polyurethane comprised of polytetrahydrofuran homo- or co-polymer soft segments.

8. The coated organism as claimed in claim 1, wherein the polymer is a polyester comprised of polytetrahydrofuran homo- or co-polymer soft segments.

9. A coated seed, comprising:
a seed; and
a coating which encloses and separates the seed and a surrounding inside environment from an outside environment, the coating being comprised of a sidechain crystallizable polymer having a water permeability which is two times or more greater above a phase transition temperature range of the polymer than is the water permeability of the coating below the phase transition temperature range of the polymer.

10. A coated seed, comprising:
a seed; and
a coating which encloses and separates the seed and a surrounding inside environment from an outside environment, the coating being comprised of a side-chain crystallizable polymer which coating prevents the seed from imbibing more than 24% by weight of water at a temperature below the seed's minimum germination temperature when the seed is exposed to water over a period of 14 days and which coating allows the seed to imbibe 60% or more by weight of water in a 15 hour period when the seed is subjected to a temperature above the minimum germination temperature of the seed.

11. The coated seed as claimed in claim 10, wherein the coating prevents the seed from imbibing more than 17% by weight of water at a temperature below the optimum germination temperature.

12. The coated seed as claimed in claim 10, wherein the seed is selected from the group consisting of cotton, soybean, broccoli, cabbage, brussels sprout, bean, pea, tomato, potato, tobacco, rice, wheat, and sunflower.

13. The coated seed as claimed in claim 10, wherein the seed is a member of the brassica family.

14. The coated seed as claimed in claim 10, wherein the seed is a member of the solanaceae family.

15. The coated seed as claimed in claim 10, wherein the seed is a corn seed.

* * * * *